United States Patent [19]

Ishida

[11] Patent Number: 5,671,022
[45] Date of Patent: Sep. 23, 1997

[54] IMAGE PROCESSING SYSTEM AND METHOD FOR CONVERTING YCBCR DATA COMPOSED OF LUMINANCE AND CHROMA INTO RGB DATA OF THREE PRIMARY COLORS

[75] Inventor: Hideo Ishida, Tokyo, Japan

[73] Assignee: NEC Corporation, Tokyo, Japan

[21] Appl. No.: 698,029

[22] Filed: Aug. 15, 1996

[30] Foreign Application Priority Data

Aug. 16, 1995 [JP] Japan .................................. 7-208888

[51] Int. Cl.$^6$ ...................................................... H04N 9/67
[52] U.S. Cl. ............................. 348/659; 348/660; 345/154
[58] Field of Search .................................... 348/659, 660, 348/661; 345/153, 154; H04N 9/67

[56] References Cited

U.S. PATENT DOCUMENTS 4,503,454  3/1985  Lewis, Jr. ............................... 348/660
4,743,960  5/1988  Duvic .................................... 348/660

*Primary Examiner*—Sherrie Hsia
*Attorney, Agent, or Firm*—Sughrue, Mion, Zinn, Macpeak and Seas

[57] ABSTRACT

An image processing system and method capable of reducing hardware scale to improve processing speed. The G conversion section includes a third product producer for producing a third product from a first intermediate product corresponding to a first common partial bit string of multipliers of a color difference Cr for R and G conversions, and a fourth product producer for producing a fourth product from a second intermediate product corresponding to a second common partial bit string of multipliers of a color difference Cb for B and G conversions, and intermediate calculation data of a fixed factor multiplication of the color difference Cr for the R data conversion and intermediate calculation data of a fixed factor multiplication of the color difference Cb for the B data conversion are utilized for the conversion calculation of the data G.

4 Claims, 5 Drawing Sheets

IMAGE PROCESSING SYSTEM AND METHOD FOR CONVERTING YCBCR DATA COMPOSED OF LUMINANCE AND CHROMA INTO RGB DATA OF THREE PRIMARY COLORS

BACKGROUND OF THE INVENTION

The present invention relates to an image processing system and method for converting YCbCr data composed of luminance and chroma into RGB data of three primary colors as image data for use in a color television system or the like.

DESCRIPTION OF THE RELATED ART

As image data of this kind, RGB data of three primary colors are well-known and there are also YCbCr data composed of a luminance signal and color difference signals. The YCbCr data are less in data amount compared with the RGB data and is hence mainly used for an image processing. After the image processing, the YCbCr data are required to be converted into RGB data for displaying an image on a display such as a color CRT monitor.

This conversion is defined by the CCIR (Comite Consultatif International des Radio-Communications=International Radio Consultative Committee) recommendation 601 as follows:

$$R = Y + 1.371 \times Cr$$

$$G = Y + 1.731 \times Cb$$

$$B = Y - 0.698 \times Cr - 0.386 \times Cb$$

These conversion formulas can be implemented in a hardware manner, for example, a method using exclusive RGB multipliers arranged in parallel or another method according to a fixed factor multiplication in which input data are bit-shifted by binary approximated multiplier factors and are then accumulated. In general, the latter is used because of its small hardware scale.

A conventional RGB conversion circuit using fixed factor multipliers as an image processing system will now be described.

The fixed factor multiplication is a multiplying method using fixed multipliers as its name shows and this method can find the n-th powers of 2 such as 2, $2^2$, $2^3$, $2^4$, $2^5$, . . . by the bit-shifting of the input data and uses that any numerical value can be expressed by a set of the n-th powers of 2. For instance, a numerical value 10 can be expressed as $1 \times 2^3 + 0 \times 2^2 + 1 \times 2^1 + 0 \times 2^0$ and these exponential values of 2 represent binary numbers. Arranging these exponential values, B1010 is obtained and "B" placed before the exponential value string represents the following numerical value is a binary number.

Hence, a multiplier is converted into a binary number and a multiplicand (original data) is shifted to the left by a digit number corresponding to the digit having a bit value "1"−1 to prepare shifted data or a partial product of a new binary number. All the shifted data obtained are accumulated to complete a multiplication. For example, when a multiplier is 3, a binary number is B11 and a multiplicand is shifted to the left by one bit to obtain shifted data. The obtained shifted data and the multiplicand are summed up to prepare a multiplication value or a product in a simple manner. When a multiplier is 10, a binary number is B1010 and a multiplicand is shifted to the left by three bits to obtain shifted data. In addition, a multiplicand is shifted to the left by one bit to obtain shifted data and these shifted data are summed up to obtain a product.

In this manner, the above described shift amount is the digit number of the bit string of the binary multiplier−1. The fixed factor multiplication is a method that shifted data (partial product or products) are prepared with respect to the digits having a bit value "1" in the binary multiplier and all the shifted data obtained are accumulated to realize a multiplication.

Similarly, multiplications of color differences Cb and Cr in RGB conversions can be performed by binary approximation of a multiplier or multipliers to obtain partial products and by accumulating the obtained partial products to carry out a fixed factor multiplication as follows:

Multiplier 1.371 of color difference Cr for R conversion→B1.01011111

Multiplier 1.731 of color difference Cb for B conversion→B1.10111011

Multiplier 0.698 of color difference Cr for G conversion→B0.1011001011

Multiplier 0.336 of color difference Cb for G conversion→B0.0101011

FIG. 1 illustrates a conventional image processing system which is constructed by complete independent hardware and comprises an R conversion section 1 for calculating R from a luminance Y and a color difference Cr, a B conversion section 2 for calculating B from the luminance Y and a color difference Cb, and a G conversion section 3 for calculating G from the luminance Y and the color differences Cr and Cb.

The R conversion section 1 includes two-input adders 11 to 13 for summing up bitwise inversion data bar (hereinafter "B") Cr of a multiplicand color difference Cr and shifted data Cr<<i (i=integer) of a plurality of color differences Cr to output a multiplication result MCr, and an adder 14 for summing up luminance Y and an output of the adder 13, i.e., the color difference multiplication result MCr to output data R. In this case, C<<n represents the data after the n-bit shifting of multiplicand data C.

The B conversion section 2 includes two-input adders 21 to 24 for summing up inverted color difference BCb and shifted data Cb<<j (j=integer) of a plurality of color differences Cb to output a multiplication result MCb, and an adder 25 for summing up luminance Y and an output of the adder 24, i.e., the color difference multiplication result MCb to output data B.

The G conversion section 3 includes two-input adders 34 to 36 for summing up inverted color difference BCr and shifted data Cr<<k (k=integer) of a plurality of color differences Cr to output a multiplication result NCr, two-input adders 31 to 33 for summing up inverted color difference BCb and shifted data Cb<<l (l=integer) of a plurality of color differences Cb to output a multiplication result NCb, a two-input adder 37 for summing up the multiplication results NCb and NCr to output an addition result NC, an inverter I31 for inverting the addition result NC to produce its complement BNC, and an adder 38 for summing up the complement BNC and the luminance Y, that is, to implement a subtraction between the addition result NC and the luminance Y to output the data G. As well-known, a complement is a number obtained by adding one to a binary bitwise inversion value and is used for a subtraction in an adder.

Next, the operation of the conventional image processing system and method described above will now be described in connection with FIG. 1.

First, the operation of the R conversion section 1 will be described. Since the binary multiplier B1.01011111 (hereinafter a binary point is omitted) of the above described color difference Cr contains seven number of the bit value "1", if shifted data are obtained based on the binary bit string and all the shifted data obtained are accumulated in a normal way, the R conversion section 1 needs seven adders. Accordingly, in order to further reduce the hardware, the following contrivance is applied for performing a calculation.

First, the multiplier is divided as follows for determining a multiplication result. B101011111={B100000000+ B1000000+(B100000−B00001)}

The first term is determined by an 8-bit left-shifted value Cr<<8 of the multiplicand color difference Cr, the second term is by a 6-bit left-shifted value Cr<<6, and the third and fourth terms are by a subtraction of (B1000000−B000001) =B011111. The subtraction is dealt with in an adder with a complement resulted from a complement conversion of the bitwise inversion value.

Hence, a multiplication of Cr×1.371 is performed by summing up bitwise inversion data BCr of a multiplicand Cr, one to be added at a complement conversion, and 5-bit left-shifted data Cr<<5, 6-bit left-shifted data Cr<<6 and 8-bit left-shifted data Cr<<8 of the multiplicand Cr. Now, +1 for the complement conversion can be determined by introducing 1 to the least significant bit of the 5-bit left-shifted data Cr<<5.

The adder 11 sums up the inverted color difference BCr and the 5-bit left-shifted data Cr<<5 to output the addition result to one input terminal of the adder 12. Inputting the 6-bit left-shifted data Cr<<6 at another input terminal, the adder 12 sums up the input data to output the addition result to one input terminal of the adder 13. Similarly, the adder 13 sums up the addition result of the adder 12 and the 8-bit left-shifted data Cr<<8 to output the product MCr to the adder 14. The adder 14 inputs the product MCr and the luminance Y and sums up these data to produce the data R (=Y+Cr×1.371).

Next, the operation of the B conversion section 2 will be described. Like the R conversion section 1, for reducing the hardware, the multiplier B110111011 is divided as follows. B110111011={B100000000+B1000000+B1110000+ (B111)}

The first term is determined by an 8-bit left-shifted value Cr<<8 of the color difference Cb, the second term is by a 6-bit left-shifted value Cr<<6, and the third term is by a 4-bit left-shifted value of a calculation result of the fourth term. The fourth term is determined using a complement by subtracting 1 from B1000.

Hence, a multiplication of Cb×1.731 is implemented by summing up bitwise inversion data BCb of a multiplicand Cb, one to be added at a complement conversion, and 3-bit left-shifted data Cb<<3 of Cb, 4-bit left-shifted data Cb'<<4 resulted from the sum of Cb, +1 and Cb<<3, 8-bit left-shifted data Cb<<8 of CB and 9-bit left-shifted data CB<<9 of Cb. Now, +1 for the addition of the complement conversion can be determined by introducing 1 to the least significant bit of the 3-bit left-shifted data Cb<<3.

Referring to FIG. 1, the adder 21 sums up the inverted color difference BCb and the 3-bit left-shifted data Cb<<3 to output the addition result to one input terminal of the adder 22. Inputting the 4-bit left-shifted data Cb'<<4 at another input terminal, the adder 22 sums up the input data to output the addition result to one input terminal of the adder 23. Then, the adder 23 inputs the output of the adder 22 at one input terminal and the 8-bit left-shifted data Cb<<8 input at another input terminal and sums up the input data to output the addition result to the adder 24. Similarly, the adder 24 inputs the output of the adder 23 and the 9-bit left-shifted data Cb<<9 and sums up the input data to output the product MCb to the adder 25. The adder 25 inputs the product MCb and the luminance Y and sums up these data to output the data B (=Y+Cb×1.731).

Next, the operation of the G conversion section 3 will be described. Like the R conversion section 1 and the B conversion section 2, in order to reduce the hardware, the multipliers B01011001011 and B00101011 of the color differences Cr and Cb are divided as follows for determining the multiplications.

First, a processing of the multiplier of Cr will be described. The above multiplier B01011001011 is divided into B1011000000+B1011. The first term is determined by a 6-bit left-shifted value of a calculation result of the second term, and the second term is by B1000+B100−1. In the same manner as above, the subtraction is dealt with in an adder using a complement resulted from a complement conversion of the bitwise inversion value.

Hence, a multiplication of Cr×0.698 is performed as follows. That is, first, the inverted data BCr of a multiplicand Cr, one for an addition at a complement conversion, 2-bit left-shifted data Cr<<2 and 3-bit left-shifted data Cr<<3 are summed up to obtain an addition result Cr', and this addition result Cr' and 6-bit left-shifted data Cr'<<6 thereof are summed up to obtain a product NCr.

Next, a processing of the multiplier of Cb will be described. The above multiplier B00101011 is divided into B101011+B1000+B100−1 from which a multiplication result is determined. It is determined by an addition of 8-bit left-shifted data Cb<<8 of a multiplicand Cb and 9-bit left-shifted data Cr<<9. Similarly, the subtraction is dealt with in an adder with a complement resulted from a complement conversion of the bitwise inversion value.

Thus, a multiplication of Cb×0.336 is carried out by summing up the inverted value BCb of the multiplicand Cb, 1 for the addition at the complement conversion, 2-bit left-shifted data Cb<<2 of Cb, 3-bit left-shifted data Cb<<3 of Cb, and 5-bit left-shifted data Cb<<5 of Cb to obtain the addition result as a product NCb.

Then, the obtained two products NCr and NCb are summed up to prepare a product NC, and this product NC is inverted to produce the complement BNC. The complement BNC and the luminance Y are summed up to produce the data B.

As shown in FIG. 1, the adder 34 sums up the inverted data BCr and the 2-bit left-shifted data Cr<<2 to output the addition result to the adder 35. The adder 35 sums up the output of the adder 34 and the 3-bit left-shifted data Cr<<3 to output the addition result Cr' to the adder 36. The adder 36 sums up the output Cr' of the adder 35 and the 6-bit left-shifted data Cr'<<6 to prepare the product NCr which is supplied to the adder 37.

On the other hand, the adder 31 sums up the inverted data BCb and the 2-bit left-shifted data Cb<<2 to output the addition result to the adder 32. The adder 32 sums up the output of the adder 31 and the 3-bit left-shifted data Cb<<3 to output the addition result to the adder 33. The adder 33 sums up the output of the adder 32 and the 5-bit left-shifted data Cb<<5 to obtain the product NCb which is supplied to the adder 37.

The adder 37 sums up the two products NCb and NCr to output the product NC to the inverter I31. The inverter I31 inverts the product NC to prepare the complement BNC to be supplied to the adder 38. The adder 38 sums up the complement BNC and the luminance Y to output the data G=Y−(0.698×Cr+0.336×Cb).

The conventional image processing system, as described above, is provided with the independent conversion circuits for converting the combination of the luminance Y and the color differences Cr and Cb into the RGB data and requires a lot of adders, which enlarges a circuit scale. Further, in the conventional image processing system, the required stage number of the adders is five, which gives a main cause of the processing speed down.

SUMMARY OF THE INVENTION

It is therefore an object of the present invention to provide an image processing system in view of the aforementioned defects of the prior art, which is capable of reducing a number of required adders, reducing a maximum cascade connection stage number of adders to reduce a hardware scale, and reducing a processing time.

It is another object of the present invention to provide an image processing method which is capable of reducing a hardware scale and reducing a processing time.

In accordance with one aspect of the present invention, there is provided an image processing system, comprising: first conversion means having first multiplying means for producing a first product of a first color difference signal and a first multiplier using a fixed factor multiplication for executing a bit shift of input data of a binary multiplicand corresponding to bit values of a binary multiplier and for accumulating the bit-shifted data; second conversion means having second multiplying means for producing a second product of a second color difference signal and a second multiplier; and third conversion means having third multiplying means for producing a third product of the first color difference signal and a third multiplier and fourth multiplying means for producing a fourth product of the second color difference signal and a fourth multiplier, first image data composed of a binary luminance signal, a binary first color difference signal and a binary second color difference signal being converted into second image data composed of binary first, second and third chrominance signals, the third multiplying means including third product producing means for producing the third product by shifting a first intermediate product corresponding to a first partial bit string as a common part of bit strings of the first and third multipliers of the first product by a first predetermined bit number, the fourth multiplying means including fourth product producing means for producing the fourth product by shifting a second intermediate product corresponding to a second partial bit string as a common part of bit strings of the second and fourth multipliers of the second product by a second predetermined bit number.

Preferably, the first and second multiplying means includes a total adder for outputting sum data of an exclusive OR of first to third input data and carry data of a logical OR of a logical AND of one of the first and second input data, the second and third input data, and the third and first input data in response to a supply of the first to third input data, and an adder for summing up the sum data and the carry data.

In accordance with another aspect of the present invention, there is provided an image processing method, comprising the steps of: producing a first product of a first color difference signal and a first multiplier using a fixed factor multiplication for executing a bit shift of input data of a binary multiplicand corresponding to bit values of a binary multiplier and for accumulating the bit-shifted data to convert into a first chrominance signal; producing a second product of a second color difference signal and a second multiplier to convert into a second chrominance signal; producing a third product of the first color difference signal and a third multiplier and a fourth product of the second color difference signal and a fourth multiplier to convert into a third chrominance signal, thereby converting first image data composed of a binary luminance signal, a binary first color difference signal and a binary second color difference signal into second image data composed of binary first, second and third chrominance signals; producing the third product by extracting a first partial bit string as a common part of bit strings of the first and third multipliers and shifting a first intermediate product as a partial bit string of a calculation result corresponding to the first partial bit string of the first product by a first predetermined bit number; and producing the fourth product by extracting a second partial bit string as a common part of bit strings of the second and fourth multipliers and shifting a second intermediate product as a partial bit string of a calculation result corresponding to the second partial bit string of the second product by a second predetermined bit number.

Preferably, the extracting of the first and second partial bit strings includes the steps of inputting a proposed bit string as a proposed partial bit string; counting first and second numbers of the proposed bit string contained in respective first and second binary multiplier bit strings; counting a third number as a number of "1" contained in the proposed bit string; calculating an addition value of the first and second numbers; determining a multiplication result as an expression number of "1" within first and second binary multiplier bit strings when using the proposed bit string; and detecting a maximum proposed bit string so that the multiplication result corresponding to the proposed bit string is maximum to output the maximum proposed bit string as the first and second partial bit strings.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
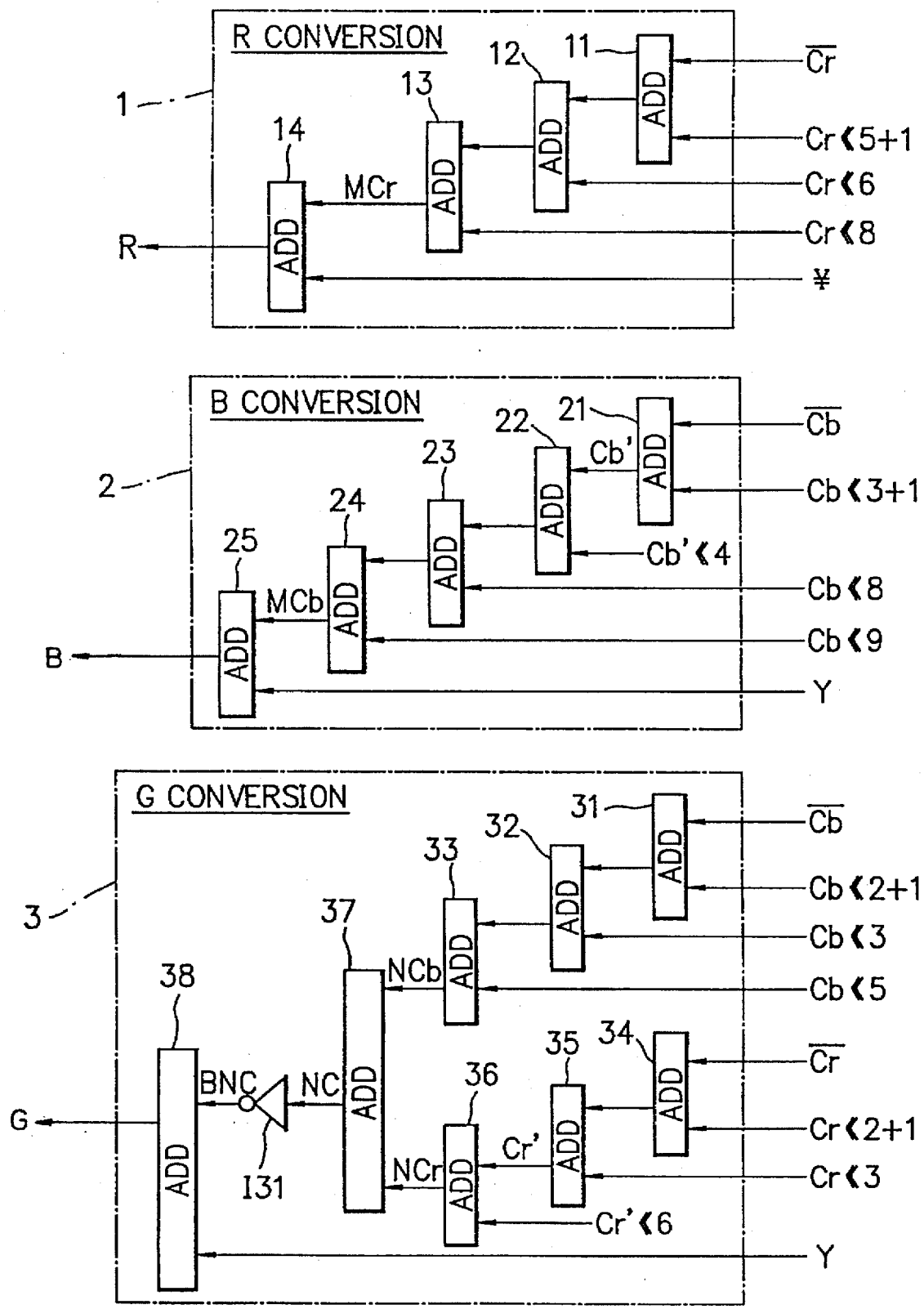
FIG. 1 is a block diagram of a conventional image processing system.
Figure 2:
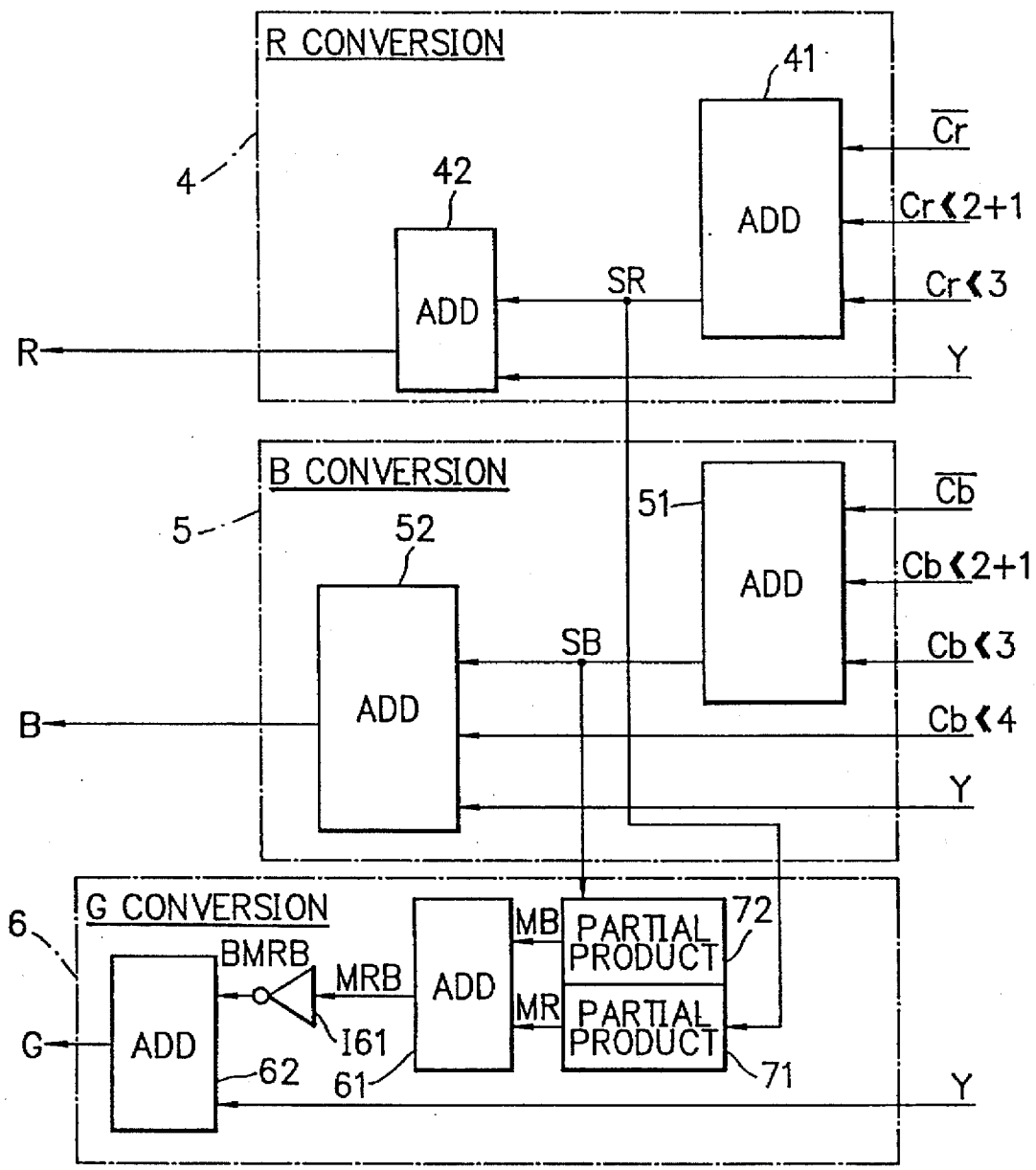
FIG. 2 is a block diagram of an image processing system according to a first embodiment of the present invention.

Referring now to the drawings, in FIG. 2, there is shown an image processing system according to a first embodiment of the present invention.

As shown in FIG. 2, the image processing system comprises an R conversion section 4 to input luminance Y and a color difference Cr and to produce data R, a B conversion section 5 to input the luminance Y and a color difference Cb and to produce data B, and a G conversion section 6 to input the luminance Y, an intermediate calculation result SR of the R conversion section 4 and an intermediate calculation result SB of the B conversion section 5 and to produce data G.

The R conversion section 4 includes a three-input adder 41 to input an inverted color difference BCr, data Cr<<2+1 which is obtained by introducing 1 to the least significant bit of 2-bit left-shifted data Cr<<2 of the color difference Cr, and 3-bit left-shifted data Cr<<3, to sum up these input data and to output the intermediate calculation result SR, and a two-input adder 42 to input the intermediate calculation result SR of the adder 41 and the luminance Y, to sum up the input data and to produce the data R.

The B conversion section 5 includes a three-input adder 51 to input an inverted color difference BCb, data Cb<<2+1 which is obtained by introducing 1 to the least significant bit of 2-bit left-shifted data Cb<<2 of the color difference Cb, and 3-bit left-shifted data Cb<<3, to sum up these input data and to output the intermediate calculation result SB, and a three-input adder 52 to input the intermediate calculation result SB of the adder 51, 4-bit left-shifted data Cb<<4 and the luminance Y, to sum up the input data and to produce the data B.

The G conversion section 6 includes first and second partial product producers 71 and 72 to input the respective intermediate calculation results SR and SB from the respective adders 41 and 51, to execute the respective desired shift operations and to produce respective partial products MR and MB, a two-input adder 61 for summing up the input partial products MR and MB to produce a partial product MRB, an inverter I61 for inverting the partial product MRB to prepare an inverted partial product BMRB, and a two-input adder 62 for summing up the inverted partial product BMRB and the luminance Y to output the data G.

Figure 3:
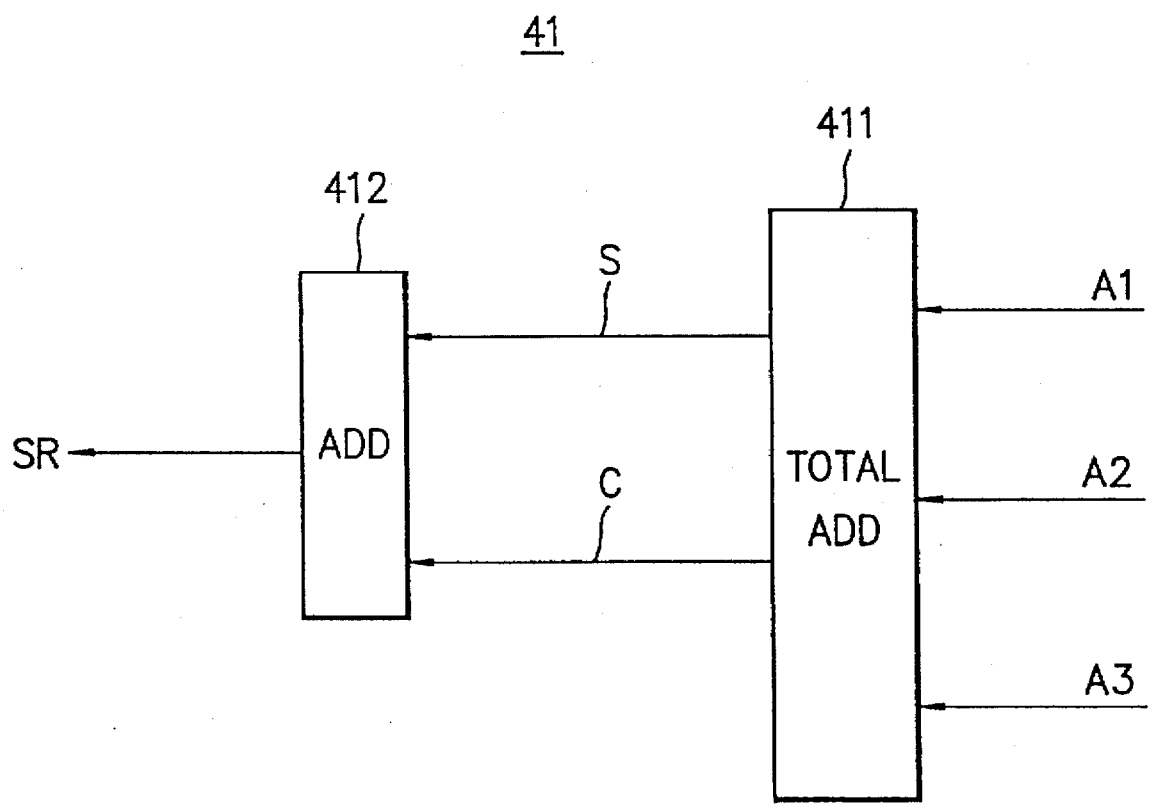
FIG. 3 is a block diagram of a three-input adder shown in FIG. 2.

FIG. 3 illustrates one embodiment of the three-input adders 41, 51 and 52 having the same construction and functions. The adder 41, for example, includes a total adder 411 and a two-input adder 412. The total adder 411 outputs a sum S and a carry C with respect to inputs A1, A2 and A3. There are shown true values of input and output values of the total adder 411 every bit in Table 1.

TABLE 1

| A1 | A2 | A3 | S | C |
|----|----|----|---|---|
| 0  | 0  | 0  | 0 | 0 |
| 0  | 0  | 1  | 1 | 0 |
| 0  | 1  | 0  | 1 | 0 |
| 0  | 1  | 1  | 0 | 1 |
| 1  | 0  | 0  | 1 | 0 |
| 1  | 0  | 1  | 0 | 1 |
| 1  | 1  | 0  | 0 | 1 |
| 1  | 1  | 1  | 1 | 1 |

The sum S is an exclusive OR of the inputs A1, A2 and A3. Comparing input logic values every bit, the exclusive OR is true or 1 when three inputs are true or 1 or any one input is true or 1, and outputs the same result as an addition result without a carry. The carry C is a logical OR of a logical AND of the inputs A1 and A2, a logical AND of the inputs A2 and A3, or a logical AND of the inputs A1 and A3. This compares the input signals A1 to A3 every bit and is true or 1 when at least two input signals are true or 1, representing a carry bit. Hence, the total adder 411 includes an addition logical section of three inputs, that is, the sum and carry sections independently and can constitute a three-input adder by adding the sum S and 1-bit left-shifted data of the carry C at the latter stage. Of the three-input adder, the difference from the usual two two-input adders coupled in series for a three-input addition is that an extremely high speed processing is possible because there is no carry operation to the upper bit and it can process by nearly the half time. Further, this three-input adder can consist of an exclusive OR, logical ANDs and a logical OR and the hardware scale can be diminished.

Next, the operation of the image processing method of the present invention will now be described.

First, the basic operation is to appropriately select binary approximations of multipliers of the color differences Cr and Cb for producing the data R and B so that binary approximations of multipliers of the color differences Cr and Cb for producing the data G may be expressed using a partial bit string of the former binary approximations. As a result, a fixed factor multiplication corresponding to the partial bit string of the binary approximations of the multipliers of the color differences Cr and Cb for producing the data R and B can be utilized for the multiplications of the color differences Cr and Cb for producing the data G.

In this embodiment, a common binary number B1011 is suitably selected as the partial bit string of the binary approximations of the multipliers of the color differences Cr and Cb for producing the data R and B by a method described hereinafter. In this case, binary approximations of multiplication factors are determined for producing the data R, B and G as follows.

Multiplier of Cr for R conversion: B1.011 (1.375)
Multiplier of Cb for B conversion: B1.1011 (1.6875)
Multiplier of Cr for G conversion: B0.1011 (0.6875)
Multiplier of Cb for G conversion: B0.01011 (0.34375)

An error of the multiplier of Cr for R conversion against the original data is (1.375−1.371)/1.371=0.3%. Similarly, errors of the multipliers of Cb for B conversion and Cr and Cb for G conversion against the original data are (1.6875−1.731)/1.731=2.5%; (0.6875−0.698)/0.698=1.5%; and (0.34375−0.336)/0.336=2.3%, respectively. In this manner, all the errors are kept in an error range within 3% and visually no difference can be observed from the original image.

With the use of these multipliers, the calculation result of the multiplication of Cr for the G conversion, that is the partial product MR can be obtained using 1-bit right-shifted data of the multiplication (Cr×1.375) of Cr for the R conversion, and the partial product MB of the multiplication of Cb for the G conversion can be obtained using 2-bit right-shifted data of the partial bit string B1011 as the intermediate calculation result of the calculation result of the multiplier of Cb for the B conversion.

As described above, according to the present invention, the fixed factor multiplication is used, in which the shifted data are summed up to product the partial product. Hence, "1" in the bit string of the multiplier shows the presence of one addition data, and, if there is a common partial bit string in two multipliers, the addition result or the product of the above partial bit string of one multiplier can be used for the multiplication of the other multiplier. In other words, the addition of the other multiplier can be omitted.

Figure 4:
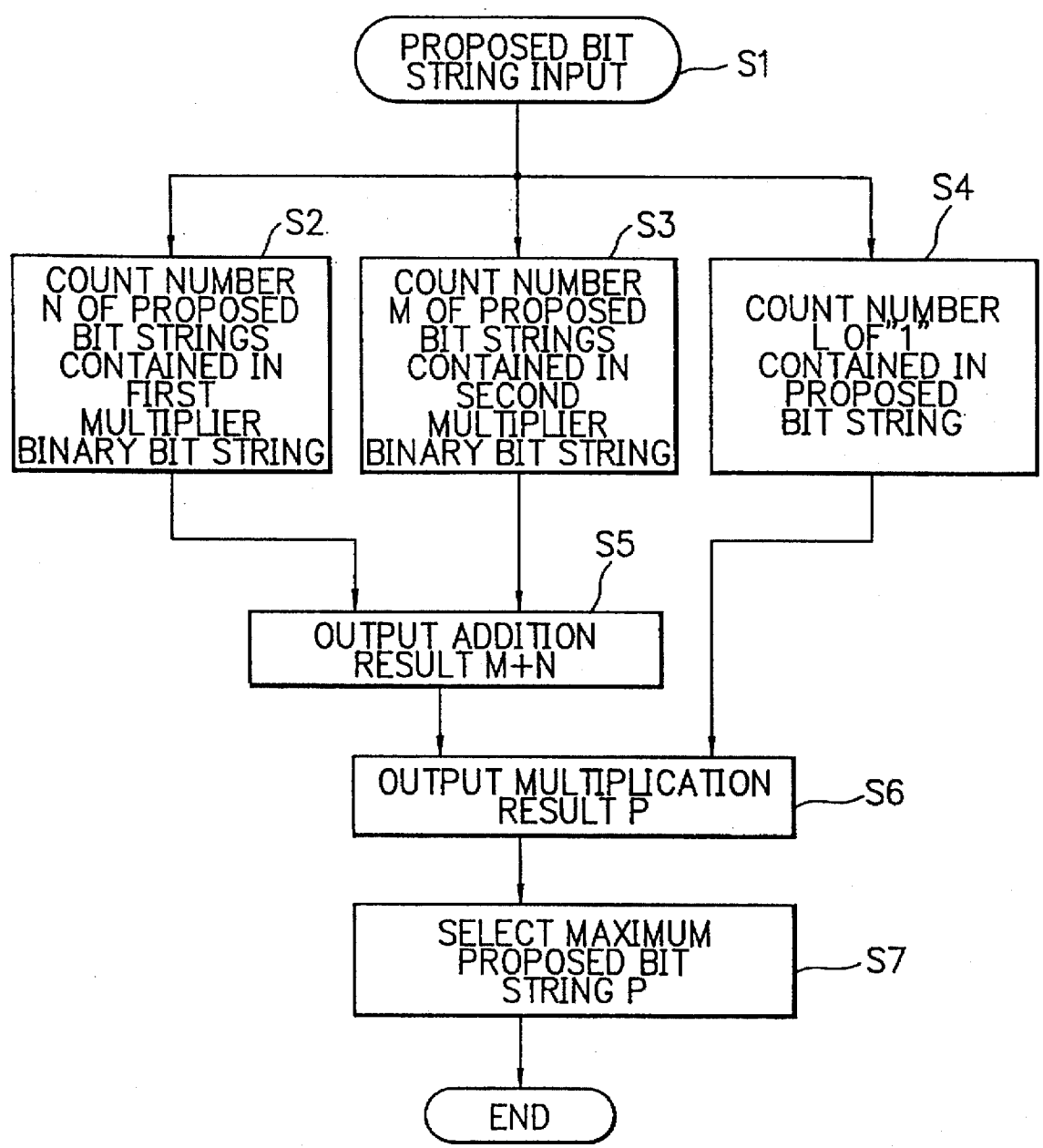
FIG. 4 is a flow chart showing a selection processing of a partial bit string in an image processing method according to one embodiment of the present invention.

Then, the selection of the partial bit string of the multipliers will now be described with reference to FIG. 4.

First, a proposed bit string U as a proposed partial bit string is input in step S1, and numbers N and M of proposed bit strings contained in the first and second binary multiplier bit strings are counted, respectively, in step S2 and step S3. A number L of "1" contained in the proposed bit string U in step S4. Next, the numbers N and M are summed up to obtain the total proposed bit string number N+M in step S5.

The expression number of "1" within the first and second binary multiplier bit strings when using the proposed bit string, that is, the multiplication result p is determined in step S6. A proposed bit string making the multiplication result p be maximum is detected to output this proposed bit string as a common partial bit string in step S7.

This selection method of the partial bit string is applied to the binary multiplier bit strings B101011111 and B01011001011 of Cr for the R and G conversions and the proposed bit strings U, their addition results N+M, the number L of "1", and the multiplication results P are shown in Table 2. Moreover, as to the binary multiplier bit strings B110111011 and B00101011, the same results as those data are shown in Table 3.

TABLE 2

| U | N + M | L | P |
|---|---|---|---|
| B01 | 6 | 1 | 6 |
| B10 | 5 | 1 | 5 |
| B11 | 4 | 2 | 8 |
| B100 | 1 | 1 | 1 |
| B101 | 3 | 2 | 6 |
| B110 | 1 | 2 | 2 |
| B111 | 1 | 3 | 3 |
| B1010 | 1 | 2 | 2 |
| B1011 | 3 | 3 | 9(MAX) |
| B1100 | 1 | 2 | 2 |
| B1111 | 1 | 4 | 4 |
| B10010 | 1 | 2 | 2 |
| B10101 | 1 | 3 | 3 |
| B10110 | 1 | 3 | 3 |
| B10111 | 1 | 4 | 4 |
| B11001 | 1 | 3 | 3 |
| B11111 | 1 | 5 | 5 |

TABLE 3

| U | N + M | L | P |
|---|---|---|---|
| B01 | 5 | 1 | 5 |
| B10 | 4 | 1 | 4 |
| B11 | 4 | 2 | 8 |
| B101 | 3 | 2 | 6 |
| B110 | 2 | 2 | 4 |
| B111 | 1 | 3 | 3 |
| B1010 | 1 | 2 | 2 |
| B1011 | 3 | 3 | 9(MAX) |
| B1101 | 2 | 3 | 6 |
| B1110 | 1 | 3 | 3 |
| B10101 | 1 | 3 | 3 |
| B10111 | 1 | 4 | 4 |
| B11011 | 2 | 4 | 8 |
| B11101 | 1 | 4 | 4 |

Referring to Table 2 and Table 3, in both the Cr and Cb cases, the proposed bit string B1011 is selected as the common partial bit string because of its maximum value 9 of the multiplication result P.

Next, the operation of the image processing system of the present invention will now be described in connection with FIG. 2 and FIG. 3.

First, although the input data is usually 8-bits and can express 0 to 255, for the convenience of description, it is assumed that the input data is 6-bits and can express 0 to 63. In place of counting fractions of 0.5 and over as a unit and cutting away the rest, the figures below a decimal point are omitted.

The input data are initially set as Cr=10 (B001010), Cb=19 (B010011) and Y=25 (B011001).

The adder 41 of the R conversion section 4 inputs inverted color difference data BCr (B111110101), data Cr<<2 (B101 and B000101001) and data Cr<<3 (B001010000). From the true value Table 1, in the total adder 411 of the adder 41, a sum S is B110001100 and, since only the carry bit becomes 1, a carry C is B001110001. The carry C exhibits the carry bit and 1-bit left-shifted data B011100010 is input to the adder 412. Thus, the adder 412, i.e., the output stage of the adder 41 rounds down the three lowmost bits of the addition value or the intermediate calculation result SR B001101110 of the data B110001100 and the data 1-bit left-shifted data B011100010 and outputs the rounded six highmost bits B001101 of the addition value, that is, 13 as the multiplication result. Then, the adder 42 inputs this multiplication result (13) of the color difference Cr and the luminance Y (25), sums up these input data and outputs the addition result (38) as the data R. B011100010 and outputs the rounded six highmost bits B001101 of the addition value, that is, 13 as the multiplication result. Then, the adder 42 inputs this multiplication result (13) of the color difference Cr and the luminance Y (25), sums up these input data and outputs the addition result (38) as the data R.

When a theoretical value RT of the data R is calculated according to the above described conversion formula, RT=25+1.375×10=38.375 is obtained, and by omitting the figures below the decimal point, the same value 38 as the above mentioned R value is resulted.

Then, the adder 51 of the B conversion section 5 inputs inverted color difference data BCb (B111101100), data Cb<<2 (B001001100), and data Cb<<3 (B010011000). Similarly, from Table 1, a total adder of the adder 51 outputs a sum S (B100111000) and 1-bit left-shifted data (B110011000) of a carry C to a further which sums the input data to produce the addition result of the adder 51, that is, the intermediate calculation result SB (B011010000).

Next, the adder 52 inputs 1-bit right-shifted data B0011010000) of the intermediate calculation result SB, data Cb<<4 (B0100110000), and the luminance Y (B0110010000). A total adder of the adder 52 outputs a sum S (B0001110000) and 1-bit left-shifted carry C (B1100100100), and an output stage or a further adder 522 of the adder 52 sums up the input data to obtain the addition result B1110010000 and omits the four lowmost bits of this addition result to outputs the six highmost bits B111001, that is, 57 as the data B.

According to the above mentioned conversion formula, a theoretical value BT of the data B is obtained as 25+0.732× 19=57.908, and by omitting the figures below the decimal point, the same value 57 as the above described data B is resulted.

Next, the partial product producer 71 carries out a 1-bit right-shift of the intermediate calculation result SR (B001101110) output from the adder 41 to produce the partial product MR (B0001101110) and outputs this partial product MR to the adder 61. The partial product producer 72 executes a 2-bit right-shift of the intermediate calculation result SB (B001101110) output from the adder 51 to produce the partial product MB (B0001101110) and outputs this partial product MB to the adder 61. The adder 61 sums up the input partial products MR and MB and outputs the addition result MRB (B0011011110) to the inverter 161. The inverter 161 inverts the addition result MRB to prepare the inverted addition result BMRB (B1100100001). The adder 62 inputs the six highmost bits of the inverted addition result BMRB, the luminance Y (B011001), and 1 for addition at the complement conversion and outputs the addition result B001011, that is, 11 as the data G.

According to the above mentioned conversion formula, a theoretical value GT of the data G is obtained as 25−0.6875× 10−0.34375×19=11.59375, and by omitting the figures below the decimal point, the same value 11 as the above described data G is obtained.

As described above, although the number of the necessary two-input adders are 17 in the conventional system, in this embodiment, it can be reduced to 6. The maximum cascade connection stage number of the adders can be reduced to three compared with five stages in the conventional system.

As a result, this is equivalent to which the hardware scale can be reduced to 40% of the conventional system. Further, the processing time can be reduced to 60% of the conventional system.

Figure 5:
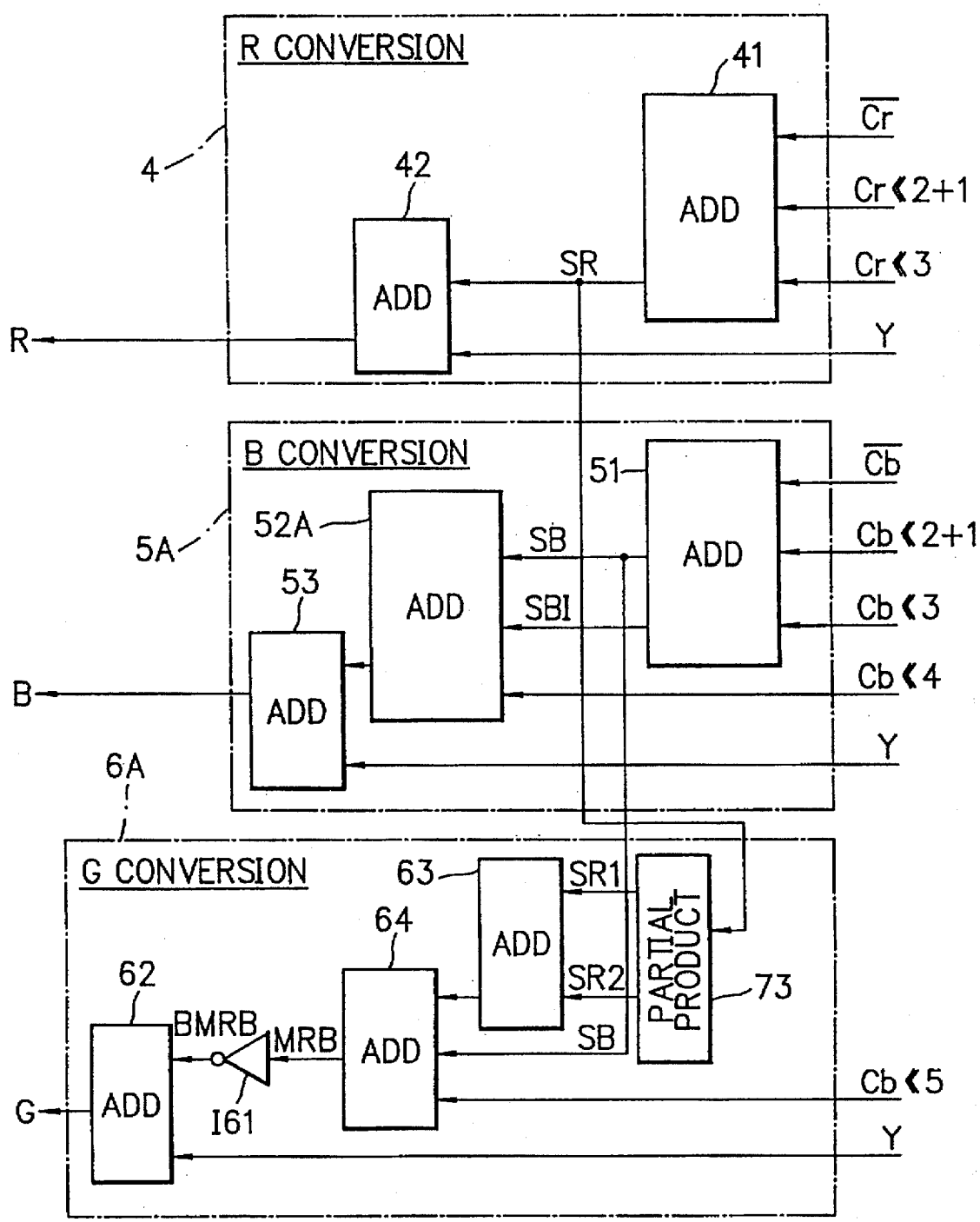
FIG. 5 is a block diagram of an image processing system according to a second embodiment of the present invention.

In FIG. 5, there is shown an image processing system according to the second embodiment of the present invention. In this embodiment, the same parts as those of the first embodiment shown in FIG. 2 are designated by the same reference characters and the description thereof can be omitted for brevity. The different points of the second embodiment from the first embodiment are as follows. A B conversion section 5A includes a three-input adder 52A to input the intermediate calculation result SB and 4-bit left-shifted data SB1 of the intermediate calculation result SB from the adder 51, and data Cb<<4 and to output an addition result, a two-input adder 53 to input the addition result of the adder 52A and the luminance Y, to sum up the input data and to output the data B. A G conversion section 6A includes a partial product producer 73 to receive the intermediate calculation result SR from the adder 41 of the R conversion section 4 and to produce 1-bit left-shifted data of SR as a first partial product SR1 and 7-bit left-shifted data of SR as a second partial product SR2, a two-input adder 63 to sum up the first and second partial products SR1 and SR2 and to output the addition result, and a three-input adder 64 to input the addition result of the adder 63, the intermediate calculation result SB from the adder 51 of the B conversion section 5A, and data Cb<<5 and to sum up the input data to produce the partial product MRB to be output to the inverter I61.

In this embodiment, binary approximations of multiplication factors are determined for producing the data R, B and G as follows.

Multiplier of Cr for R conversion: B1.011 (1.375)
Multiplier of Cb for B conversion: B1.10111011 (1.6875)
Multiplier of Cr for G conversion: B0.1011001011 (0.6875)
Multiplier of Cb for G conversion: B0.0101011 (0.336)

In this case, an error of the multiplier of Cr for the R conversion against the original data is (1.375−1.371)/1.371= 0.3% and no error against the other multipliers occurs.

By using these multipliers, the data b can be calculated by summing up 1-bit right-shifted data of the multiplication result of the bit string B1011 of the multiplier of Cb for the B conversion, 5-bit right-shifted data of the multiplication result of the above bit string B1011, and the data Cb. The intermediate calculation result of the multiplier for the G conversion can be obtained using 1-bit right-shifted data of the multiplication (Cr×1.375) of Cr for the R conversion and 7-bit right-shifted data of the same. The data G can be calculated by summing up 4-bit right-shifted data of the intermediate calculation result in the partial bit string B1011 of the multiplication of Cr for the B conversion, and 2-bit right-shifted data of Cb.

The operation of the image processing system according to the second embodiment of the present invention will now be described with reference to FIG. 5. The R conversion section 4 operates in the same manner as that of the first embodiment described above. That is, it inputs inverted color difference BCr, data Cr<<2+1 obtained by introducing 1 into the least significant bit of 2-bit left-shifted data Cr<<2 of the color difference Cr, data Cr<<3, and the luminance Y, and sums up the input data to output the intermediate calculation result SR and the data R.

In the B conversion section 5A, the adder 51 inputs the inverted color difference BCb, data Cb<<2+1 obtained by introducing 1 into the least significant bit of 2-bit left-shifted data Cb<<2 of the color difference Cb and data Cb<<3 and sums up the input data to output the addition result as the intermediate calculation result SB. The adder 52A inputs the intermediate calculation result SB and 4-bit left-shifted data SB1 of the intermediate calculation result SB from the adder 51, and the data Cb<<4 and sums up the input data to output the addition result to the adder 53. The adder 53 inputs the addition result of the adder 52A and the luminance Y and sums up the input data to output the data B.

In the G conversion section 6A, the partial product producer 73 inputs the intermediate calculation result SR from the adder 41 of the R conversion section 4, produces 1-bit left-shifted data of SR as a first partial product SR1 and 7-bit left-shifted data of SR as a second partial product SR2, and supplies the two partial products SR1 and SR2 to the adder 63. The adder 63 sums up the two partial products SR1 and SR2 and outputs the addition result to the adder 64. The adder 64 inputs the addition result of the adder 63, the intermediate calculation result SB from the adder 51 of the B conversion section 5A and the data Cb<<5, sums up the input data and outputs the partial product MRB to the inverter I61.

The inverter I61 inverts the partial product MRB and produces the inverted partial product BMRB to output the inverted partial product BMRB to the adder 62. The adder 62 inputs the inverted partial product BMRB and the luminance Y, sums up the input data and outputs the addition result as the data G.

In this embodiment, when the input data such as Cr=6 (B000110), Cb=9 (B001001) and Y=21 (B010101) are supplied, the calculation is carried out in the same manner as described above to obtain R=29, B=36 and G=14.

In this way, in this embodiment, the number of the required two-input adders can be reduced to eight. The maximum cascade connection stage number of the adders can be reduced to four. This is equivalent to which the hardware scale is reduced to 50% of the conventional system. Furthermore, the processing time can be reduced to 80% of the conventional system.

As described above, in the image processing system and method of the present invention, the G conversion section includes a third product producer for producing a third product from a first intermediate product corresponding to a first common partial bit string of multipliers of a color difference Cr for R and G conversions, and a fourth product producer for producing a fourth product from a second intermediate product corresponding to a second common partial bit string of multipliers of a color difference Cb for B and G conversions, and intermediate calculation data of a fixed factor multiplication of the color difference Cr for the R data conversion and intermediate calculation data of a fixed factor multiplication of the color difference Cb for the B data conversion are utilized for the conversion calculation of the data G. Hence, although the conventional system requires 17 two-input adders, the number of the required adders is reduced to six in the first embodiment and to eight in the second embodiment. Further, although the maximum stage number of adders is five in the conventional system, it is reduced to three in the first embodiment and to four in the second embodiment.

According to the present invention, the number of the necessary adders can be largely reduced and thus the circuit scale can be largely diminished. In addition, the maximum cascade connection stage number of the adders can be reduced and hence the processing time can be reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image processing system, comprising:

first conversion means having first multiplying means for producing a first product of a first color difference signal and a first multiplier using a fixed factor multiplication for executing a bit shift of input data of a binary multiplicand corresponding to bit values of a binary multiplier and for accumulating the bit-shifted data;

second conversion means having second multiplying means for producing a second product of a second color difference signal and a second multiplier; and third conversion means having third multiplying means for producing a third product of the first color difference signal and a third multiplier and fourth multiplying means for producing a fourth product of the second color difference signal and a fourth multiplier, first image data composed of a binary luminance signal, a binary first color difference signal and a binary second color difference signal being converted into second image data composed of binary first, second and third chrominance signals, the third multiplying means including third product producing means for producing the third product by shifting a first intermediate product corresponding to a first partial bit string as a common part of bit strings of the first and third multipliers of the first product by a first predetermined bit number, the fourth multiplying means including fourth product producing means for producing the fourth product by shifting a second intermediate product corresponding to a second partial bit string as a common part of bit strings of the second and fourth multipliers of the second product by a second predetermined bit number.

2. An image processing system of claim 1, wherein the first and second multiplying means includes:

a total adder for outputting sum data of an exclusive OR of first to third input data and carry data of a logical OR of a logical AND of one of the first and second input data, the second and third input data, and the third and first input data in response to a supply of the first to third input data, and an adder for summing up the sum data and the carry data.

3. An image processing method, comprising the steps of:

producing a first product of a first color difference signal and a first multiplier using a fixed factor multiplication for executing a bit shift of input data of a binary multiplicand corresponding to bit values of a binary multiplier and for accumulating the bit-shifted data to convert into a first chrominance signal;

producing a second product of a second color difference signal and a second multiplier to convert into a second chrominance signal:

producing a third product of the first color difference signal and a third multiplier and a fourth product of the second color difference signal and a fourth multiplier to convert into a third chrominance signal, thereby converting first image data composed of a binary luminance signal, a binary first color difference signal and a binary second color difference signal into second image data composed of binary first, second and third chrominance signals;

producing the third product by extracting a first partial bit string as a common part of bit strings of the first and third multipliers and shifting a first intermediate product as a partial bit string of a calculation result corresponding to the first partial bit string of the first product by a first predetermined bit number; and producing the fourth product by extracting a second partial bit string as a common part of bit strings of the second and fourth multipliers and shifting a second intermediate product as a partial bit string of a calculation result corresponding to the second partial bit string of the second product by a second predetermined bit number.

4. An image processing method of claim 3, wherein the extracting of the first and second partial bit strings includes the steps of:

inputting a proposed bit string as a proposed partial bit string;

counting first and second numbers of the proposed bit string contained in respective first and second binary multiplier bit strings;

counting a third number as a number of "1" contained in the proposed bit string;

calculating an addition value of the first and second numbers;

determining a multiplication result as an expression number of "1" within the first and second binary multiplier bit strings when using the proposed bit string; and detecting a maximum proposed bit string so that the multiplication result corresponding to the proposed bit string is maximum to output the maximum proposed bit string as the first and second partial bit strings.

* * * * *

UNITED STATES PATENT AND TRADEMARK OFFICE
CERTIFICATE OF CORRECTION

PATENT NO.    : 5,671,022
DATED         : September 23, 1997
INVENTOR(S)   : Hideo ISHIDA It is certified that error(s) appears in the above-identified patent and that said Letters Patent is hereby corrected as shown below:

Column 10, line 25, after "further" insert --adder--.

Signed and Sealed this

Seventeenth Day of February, 1998

Attest:

BRUCE LEHMAN

Attesting Officer          Commissioner of Patents and Trademarks